United States Patent [19]
Burns et al.

[11] Patent Number: 5,623,507
[45] Date of Patent: Apr. 22, 1997

[54] ERROR POINTERS FOR ENHANCED ERROR CORRECTION

[75] Inventors: Kenneth R. Burns, Nederland; Neal Glover, Broomfield; Hossein F. Sevvom, Boulder, all of Colo.

[73] Assignee: Storage Technology Corporation, Louisville, Colo.

[21] Appl. No.: 759,219

[22] Filed: Sep. 13, 1991

[51] Int. Cl.⁶ ............................. G11C 29/00; G06F 11/00
[52] U.S. Cl. ................................................. 371/40.3
[58] Field of Search ...................................... 371/40.3, 6

[56] References Cited

U.S. PATENT DOCUMENTS

| | | | |
|---|---|---|---|
| 3,248,695 | 4/1966 | Dascotte | 340/146.1 |
| 3,958,220 | 5/1976 | Marshall | 371/40.3 |
| 4,456,992 | 6/1984 | Schaub | 371/6 |
| 4,525,839 | 7/1985 | Nozawa et al. | 371/38 |
| 4,916,701 | 4/1990 | Eggenberger et al. | 371/37.7 |
| 4,922,493 | 5/1990 | Kase | 371/31 |
| 4,965,800 | 10/1990 | Farnbach | 371/22.1 |
| 5,216,677 | 6/1993 | Takagi et al. | 371/40.3 |
| 5,222,069 | 6/1993 | Chevalley | 371/40.3 |
| 5,231,638 | 7/1993 | Fujiki | 371/40.3 |

*Primary Examiner*—Robert W. Beausoliel, Jr.
*Assistant Examiner*—D. Vales
*Attorney, Agent, or Firm*—Duft, Graziano & Forest, P.C.

[57] ABSTRACT

Signal processing circuitry receives input signals representing modulation encoded binary data signals. The signal processing circuitry contains a plurality of signal quality detectors which monitor a corresponding plurality of different characteristics of each received signal to determine whether or not the signal is of an adequate quality insofar as concerns the characteristic of the signal associated with each detector. Each detector generates a binary output signal representing a confidence level pointer associated with each such received signal. The pointer signals are stored in a buffer with received data signals. The contents of the buffer, which at this time contain the bytes of the received data record as well as the associated pointer bytes, are made available to a control module. Only the data and redundancy bytes of the record stored in the buffer are used by the control module if the data bytes are of sufficiently high quality so that any errors in the data bytes can be corrected using the redundancy bytes. If the received data bytes of the record are corrupted so that they cannot be corrected by the use of only the redundancy bytes, the control module reads the data buffer to receive the pointer bits of the record. The pointer bits specify with particularity which data bytes likely, contain errors. The control module uses the received pointer bits together with the redundancy bytes to correct the corrupted data bytes.

46 Claims, 4 Drawing Sheets

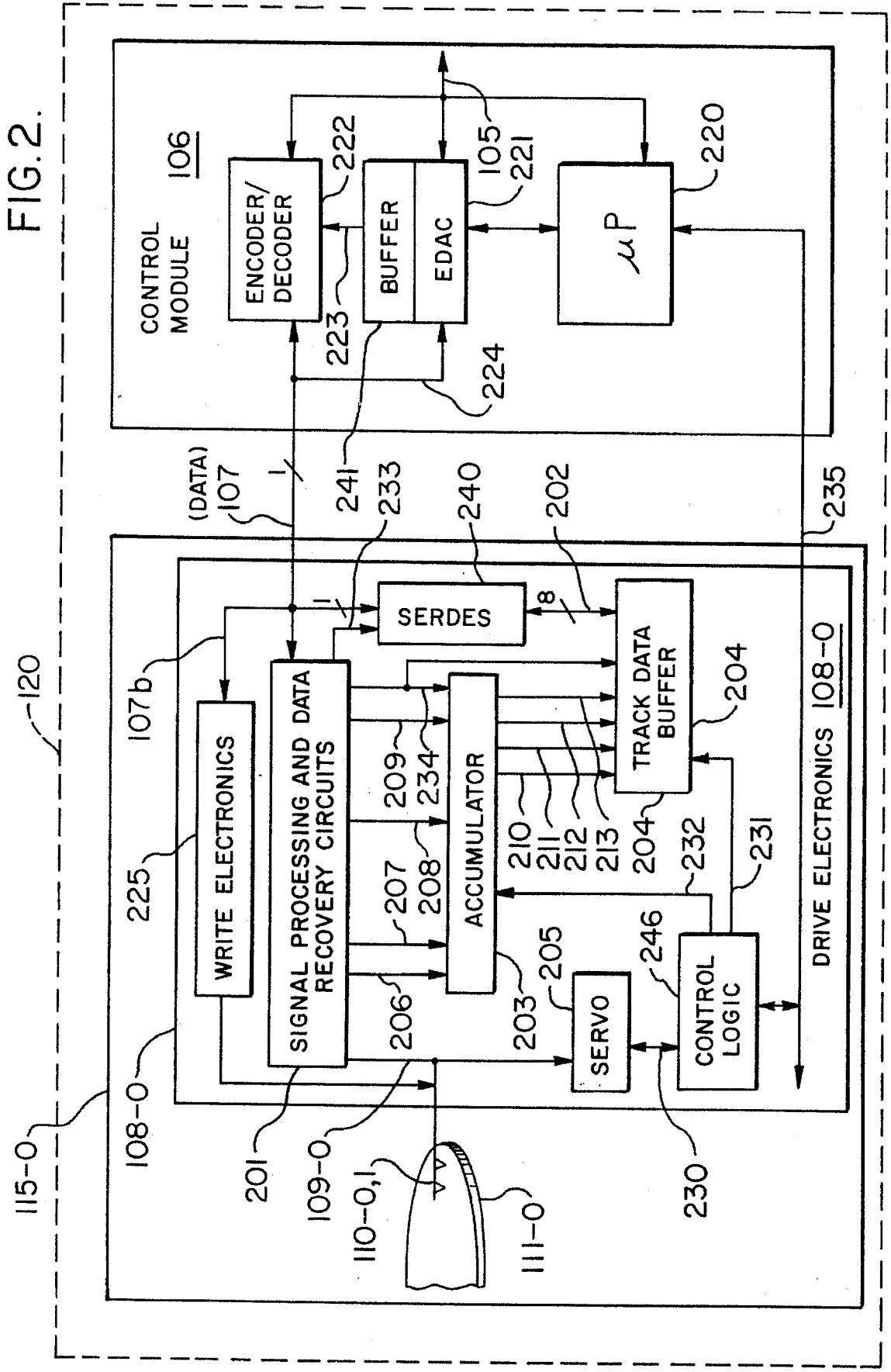

ERROR POINTERS FOR ENHANCED ERROR CORRECTION

CROSS REFERENCE TO RELATED APPLICATIONS

This application is related to application Ser. No. 70/304,788 entitled Track Image Read/Write Head Buffer filed by Robert Elmer Dean, et al. on Jan. 31, 1989, now abandoned and refiled as continuation application Ser. No. 07/622,922 on Dec. 6, 1990.

FIELD OF THE INVENTION

This invention relates to data systems and, in particular, to the provision of enhanced error correction facilities in a data system. This invention further relates to the provision of enhanced error correction facilities in peripheral memory storage and retrieval systems such as disk subsystems and the like.

PROBLEM

It is known to add redundancy bits to the data bits of a record when the record is recorded on a storage medium. The redundancy bits facilitate error correction when errors are detected as the stored record is subsequently read and processed. It is a problem if the data that is read contains such a large number of errors that the error correcting capabilities of the redundancy bits are overwhelmed. It is a particular problem in peripheral data storage and retrieval systems to provide error correction facilities that reliably permit corrupted data to be read, corrected and applied error-free to a host processor that requests the data.

The above-identified Dean et al. application discloses a peripheral data storage system having a track image data buffer in each data module of a DASD (direct access storage device) data string. This reduces the time that the system control unit and control module and host processor must wait for requested data records stored on the system disks to be read and returned to the host. This reduction is achieved by making the data read operation independent of the control module, the control unit and the availability of a data path from the control unit to the host processor. A requested data record containing data and redundancy bits is read and stored by Dean et al. in the track image data buffer in a two, seven run length limited (RLL) self clocking code format. The control module receives the image of the data record read from the disks, deformats this data from its bit serial self clocking coding, and converts it to eight bit parallel format. The data record can either be received by the control module concurrently as it is read and entered into the track image data buffer or, alternatively, can be subsequently read out of the buffer and applied to the control module. The control module corrects the data record, if necessary, using the redundancy bits read from the medium along with the data and transmits only the corrected data bytes of the record to the host processor.

The Dean et al. system provides error correction capabilities only to the degree permitted by the redundancy bits contained in the requested data record. While these error correction capabilities are adequate for some purposes, these capabilities may be overwhelmed when the data received by the control module contains an excessive number of errors. This can occur when the electronics associated with the read operation has difficulty in determining whether a received signal represents a binary zero or a binary one. This may be caused by many factors such as deficiencies in the amplitude of the signal read from the disk, deficiencies in the position and polarity of a received signal, errors in the phase of a signal and run length code violations. While the error correction capabilities of prior art arrangements, including the use of redundancy bytes, can correct some randomly occurring errors, they are incapable of correcting excessively corrupted data.

It may be seen that it is a problem in digital systems to provide error correction facilities that correct errors in excessively corrupted data. This can limit the confidence a system user has in the data exchanged between a host processor and a peripheral memory and may require the host processor to perform additional tasks to ensure the accuracy of a received data record.

SOLUTION

The above problem is solved and an advance in the art is achieved by the provision of improved error correction capabilities in digital signal processing systems. In accordance with one possible exemplary embodiment of the invention, enhanced error correction facilities are provided for a peripheral memory subsystem by generating pointer bits indicative of the quality of received data signals and by recording the pointer bits in a track image data buffer of the type shown by Dean et al. along with the track image of the received data record. A track containing a requested data record comprising data and redundancy bytes is read from a disk or other storage medium, applied to signal processing circuits and then applied by the signal processing circuits to the track image data buffer. The requested record read from the track may either be applied to the control module concurrently as the record is applied to the buffer or, alternatively, may be subsequently applied to the control module by reading the record out of the buffer.

A plurality of pointer bits may be generated by a corresponding plurality of detectors in the signal processing circuits as each bit of the requested data record is read from the storage medium. The plurality of detectors analyze a corresponding plurality of characteristics of each received bit and generate a pointer bit for each characteristic for each received bit. In accordance with one possible exemplary embodiment of the invention, the detectors determine the adequacy of the signal strength of each received data bit signal, the adequacy of the pulse position and polarity for each received data bit signal, the validity of the sequence of data signals to abide by RLL code rules, as well as the phase of each received data bit signal. Each detector generates a pointer output signal indicating the level of confidence the signal processing circuitry has in determining whether each received data bit signal represents a binary 1 or 0.

Let it be assumed that if a detector has confidence in its determination, the detector applies a binary zero as a pointer to its output conductor and applies a binary one as a pointer to its output conductor if it does not have a high degree of confidence. For a properly operating system, the various detectors will normally have confidence in their determination and output a binary zero as a pointer. For four such detectors, four pointers of zero are normally generated and recorded in the track image data buffer along with the remainder of the eight bits, for example, comprising each data byte. When the system encounters operational difficulties, such as a defective data medium or defective signal processing circuitry, one or more of the detectors will not have a high degree of confidence as to whether a received data signal represents a binary 1 or 0. The signal processing circuitry does its best and outputs a 0 or a 1 for each such questionable data bit. However, since there is not great confidence in its determination, the detectors output a binary one for one or more pointer bits which are then recorded in the track image data buffer along with the data bits of the requested record. Since the entirety of the track containing the requested data record is stored into the track image data buffer, the pointer generation circuitry of the invention operates on the signals representing all bytes of the track and performs the pointer generation for all records on the track.

If the control module is idle when a record is read, it interacts with the drive electronics of a drive module as a record read request is processed by the drive module and monitors the received signals representing the various fields, including the count field, of every data record as the bytes of each record are read and applied to the track image data buffer of the drive module. When the control module detects the count field of the data record requested by the host processor, it unlocks its input circuitry and stores the data bytes of the requested data record. This is done concurrently with the entry of the bytes of the data record into the track image data buffer. Alternatively, if the control module is busy when a requested data record is read and entered into the track image data buffer, the control module can subsequently receive the record from the track image data buffer.

In either event, the data bytes are processed by the control module after they are received. If the error detection and correction (EDAC) circuitry of the control module determines that the data bytes appear to be error free or can be corrected using the received redundancy bits of the record, the data bytes of the data record are corrected, and extended via a control unit and channel to the host processor. If the EDAC determines that an excessive number of errors exist in the received data bytes, it causes the pointers associated with the defective bytes of the data record to be read out of the track image data buffer and applied to the EDAC. The EDAC uses these pointers to determine which data bytes of the record are in error. The EDAC then uses the received pointer and redundancy bits to correct the defective data bytes. The EDAC outputs the corrected data bytes via the control unit to the host processor.

The EDAC operates in a conventional manner in using error pointers to correct corrupted data. The number of symbols that can be corrected is given by the below-indicated inequality:

$$2e+s \leq d-1$$

where, e is the number of symbols that are in error without error pointers, s is the number of symbols in error with error pointers, and d is the minimum distance of the code and is generally equal to the number of redundancy symbols plus one.

The error correction using pointers can be characterized as follows. Each of the d−1 redundancy symbols provides one equation. With d−1 equations one can solve for d−1 unknowns. Each error without an associated error pointer has two unknowns namely, the unknown error location and the unknown error value. Each error with an associated error pointer has a single unknown which is the error value. For example, let it be assumed that the term d−1 equals ten which is equal to the number of redundancy symbols. Assume first of all that in a given situation there are no pointers and in this case the term s equals zero. In this case, the equation indicates that 2e can be no greater than 10 and therefore 5 error symbols can be corrected without error pointers. Next, in order to illustrate the usefulness of pointers, assume that e equals 0 and that s equals 10 indicating that 10 symbols are in error with error pointers. In this case, the inequality indicates that 10 symbols in error with error pointers can be corrected. The above indicates that the use of error pointers is advantageous in that it permits an extra symbol that is an error to be corrected for each error pointer.

The circuitry of the present invention generates pointers identifying all bytes of a requested data record that may possibly be defective and applies these defective bytes to the EDAC of the control module. The EDAC responds, and corrects each identified byte as necessary so that the entirety of the desired data record is transmitted via the control unit and the channel back to the host processor with improved data integrity.

In summary, the EDAC corrects errors in the received data to the extent permitted by the received redundancy bits and pointers. The EDAC does not need the pointers in all instances to correct data. As indicated by the above inequality, if the errors are limited in number, the error correction facilities of the EDAC permit a limited number of errors to be corrected without the use of the pointer bits. On the other hand, if the data is particularly corrupted so that an increased number of errors exist in the received data, the pointers permit the EDAC to correct one extra error symbol for each received pointer compared to the number of symbols the EDAC could correct without error pointers. If the data is sufficiently corrupted, and the number of pointer bits is limited, it is possible that in some instances the error correction capability of the EDAC will be overwhelmed and the data errors will not be corrected.

It may be seen that the present invention solves the above problem and permits a memory subsystem to transmit data records that are free from errors to a host processor.

BRIEF DESCRIPTION OF THE DRAWING

The invention may be better understood from a reading of the following detailed description of one possible exemplary embodiment thereof taken in conjunction with the drawing in which:

FIG. 2 illustrates further details of the drive electronics of a drive module together with further details of the control module;

DETAILED DESCRIPTION

Figure 1:
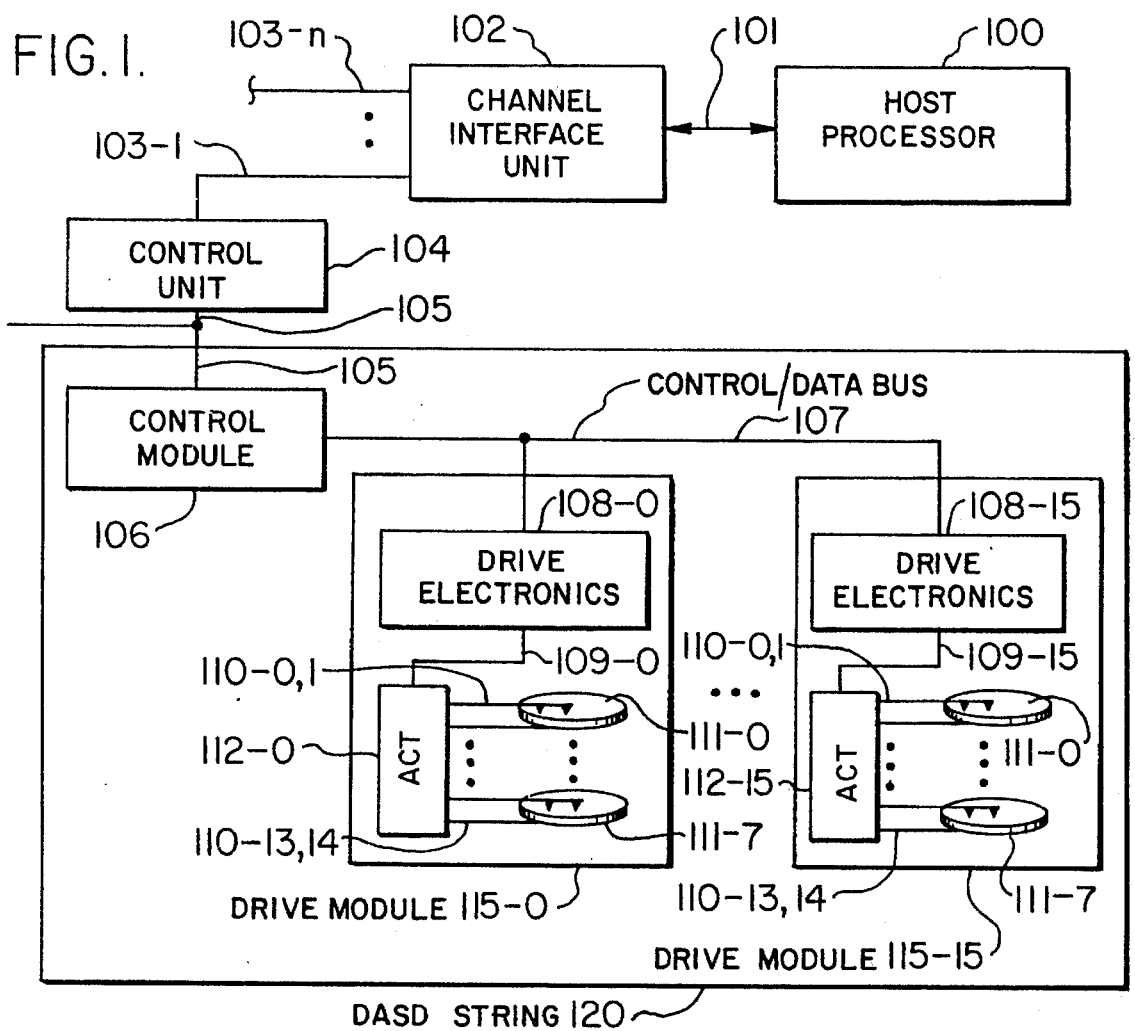
FIG. 1 illustrates overall architecture of a system embodying one possible embodiment of the invention.

In peripheral memory systems, a host processor is typically connected by a channel interface unit to a plurality of data channels. Each data channel is connected via a control unit to one or more DASD strings which function to store large quantities of data. These DASD strings typically use rotating data storage media (hereinafter disks) comprised of either optical disks or magnetic disks to store data records thereon. A typical DASD string may comprise IBM 3380-type disk drive units that use magnetically readable/writable disks. The channel typically carries eight bit parallel data in a byte serial decoded input/output record format. The control unit performs a data management function to maintain records of the physical location of all the data stored by its associated DASD strings. Each DASD string includes a plurality of drive modules, each of which contains rotating magnetically readable/writable disks, each of which has associated therewith one or more moveable read/write heads. A control module is included in each DASD string and is connected to the control unit to convert data between the eight bit parallel data format of the data channel and the bit serial data format of the disks of the DASD string. In addition, the control module controls data formatting, error correction code generation, and conversion of the bit serial data to a magnetically storable sequence via modulation encoding, typically RLL. The control module is connected by way of a bus to a plurality of drive modules containing read/write heads attached to an actuator. The heads read and write data on associated disks.

Data Record Read Operation

In a data record read operation, the host processor transmits a seek request through the channel interface unit and over an available data channel to the control unit serving the DASD string containing the data on which the requested data record is stored. The host processor, upon completion of the transmission of the seek request, returns to processing other tasks. The control unit responds to the seek request by determining the physical location of the requested data record on the plurality of disks. The control unit transmits information to the associated control module identifying the physical location and size of the data record to retrieve the requested data record from the disk containing the record. Since the data record is stored in a track format on a disk, the actuator associated with the identified disk waits until the disk rotates a sufficient distance to position the beginning of the requested data record underneath the read/write head of the actuator.

A predetermined time before the beginning of the requested data record reaches the read/write head of the actuator, the control module requests the control unit to obtain a channel to the host processor in order to transmit the requested data record from the disk to the host processor. If a channel to the host processor is not available, the control module waits for one entire revolution of the disk before the disk is again in the position where the requested data record is a sufficient distance away from the read/write head to establish a channel connection to the processor. This process is repeated until a channel to the host processor is available. The data on the disk is then read and transmitted via the control module and control unit and an available data channel to the host processor.

It is obvious that there can often be delays in this data storage system while data communication paths are established. In a transaction based system where there are a multitude of random data seeks, such delays can unnecessarily tie up actuators in the disk drive unit and significantly increase the system response time.

The track image data buffer of Dean et al. improves data transfer performance in a disk storage system by rendering the data read operation at the read/write head independent of the control module, the control unit and the availability of a channel from the control unit to the processor. The provision of a Dean et al. track image data buffer for each read/write head permits a seek request from the host processor to be handled as soon as the beginning of the requested data record is positioned below the read/write head of the associated actuator. The entire disk track containing the requested data record is read from the disk and stored in the track image data buffer independent of the availability of a data communication path to the processor. Thus, the disk read data record operation need not be synchronized with the availability of a data communication path to the processor.

A data record on the disk includes data bits and redundancy bits which facilitate error correction. The data record is read by the read/write head and applied in a run length limited self clocking code format (such as 2, 7 coding) to the track image data buffer associated with the actuator on which the head is mounted. The error correction redundancy bits of the record, appended to the data bits, are also stored in the buffer. The track image data buffer does not process the track image read from the disk. Instead, it temporarily stores this track image for subsequent deformatting and processing by the control module. By providing the track image data buffer on a one per actuator basis, the system response time for a record read request is significantly reduced since the requested data record is retrieved from the rotating media as soon as the data record is properly positioned under the head. In no case will this time be greater than one disk revolution. In addition, caching the entire track image that contains the requested data record speeds up the data retrieval time for subsequently requested data records from the same track.

The error correction redundancy information written on the disk to protect the integrity of the requested data record is maintained since it is stored in the track image data buffer along with the data record. Once a channel is established to the host processor, the control module receives the requested record from the track image data buffer and deformats this data from its bit serial, run length limited self clocking (ex. two, seven) coding. It converts this information to eight bit parallel data that is applied the control unit. The control unit receives and stores the decoded, error-checked data record and transmits it to the host processor over the available data channel.

System Architecture

FIG. 1 illustrates the architecture of a data processing system comprising a DASD data storage system that includes a plurality of memory devices, one of which is illustrated in FIG. 1 in the form of a conventional 3380-type DASD string 120. Host processor 100 is connected via bus 101 to a channel interface unit 102 that interconnects host processor 100 with a plurality of data channels 103-1 to 103-n, each of which is an eight bit parallel data bus. Control unit 104 is connected to data channel 103-1. Control unit 104 is also connected via path 105 to DASD string 120.

Control unit 104 provides overall management of DASD string 120. This management function includes storing information that identifies the physical location of all data stored on the drive modules 115-0 to 115-15 of DASD string 120. Host processor 100 identifies a data record by a volume identification and address. While this information provides a general physical location of the data, the exact location on disks surfaces 111-0 to 111-7 of a drive module 115 requires additional specificity. Control unit 104 provides this additional information by converting the volume and address information received from the host processor into volume, cylinder, head and sector identification information to precisely define the physical location of the requested data record.

Control unit 104 transfers data between channel 103-1 and one or more control modules 106 of the DASD strings 120 in an eight bit parallel data format. Data in this format is converted by control module 106 into a bit serial format wherein error correction code redundancy characters are appended thereto for error detection and control purposes. The resultant data is then encoded into two, seven RLL modulation code.

Control module 106 responds to signals transmitted by control unit 104 identifying the volume, cylinder, head and sector for a data record. Volume is decoded to one of the plurality of drive modules 115-0 to 115-15. While sixteen drive modules 115 are illustrated herein, it is expected that future devices may be equipped with 32 or more drive modules. Drive modules 115 contain one drive electronics 108 for controlling the reading and writing of data and one actuator 112 for positioning the plurality of heads 110-0 to 110-14. A cylinder is selected by moving actuator 112 of the selected drive module to cause heads 110-0 to 110-14 to be positioned over a set of the concentric tracks on disk surfaces 111-0 to 111-7. A single head of the plurality of heads 110, by head switching facilities not shown, is connected to drive electronics 108. This is the currently active head of the actuator.

Figure 3:
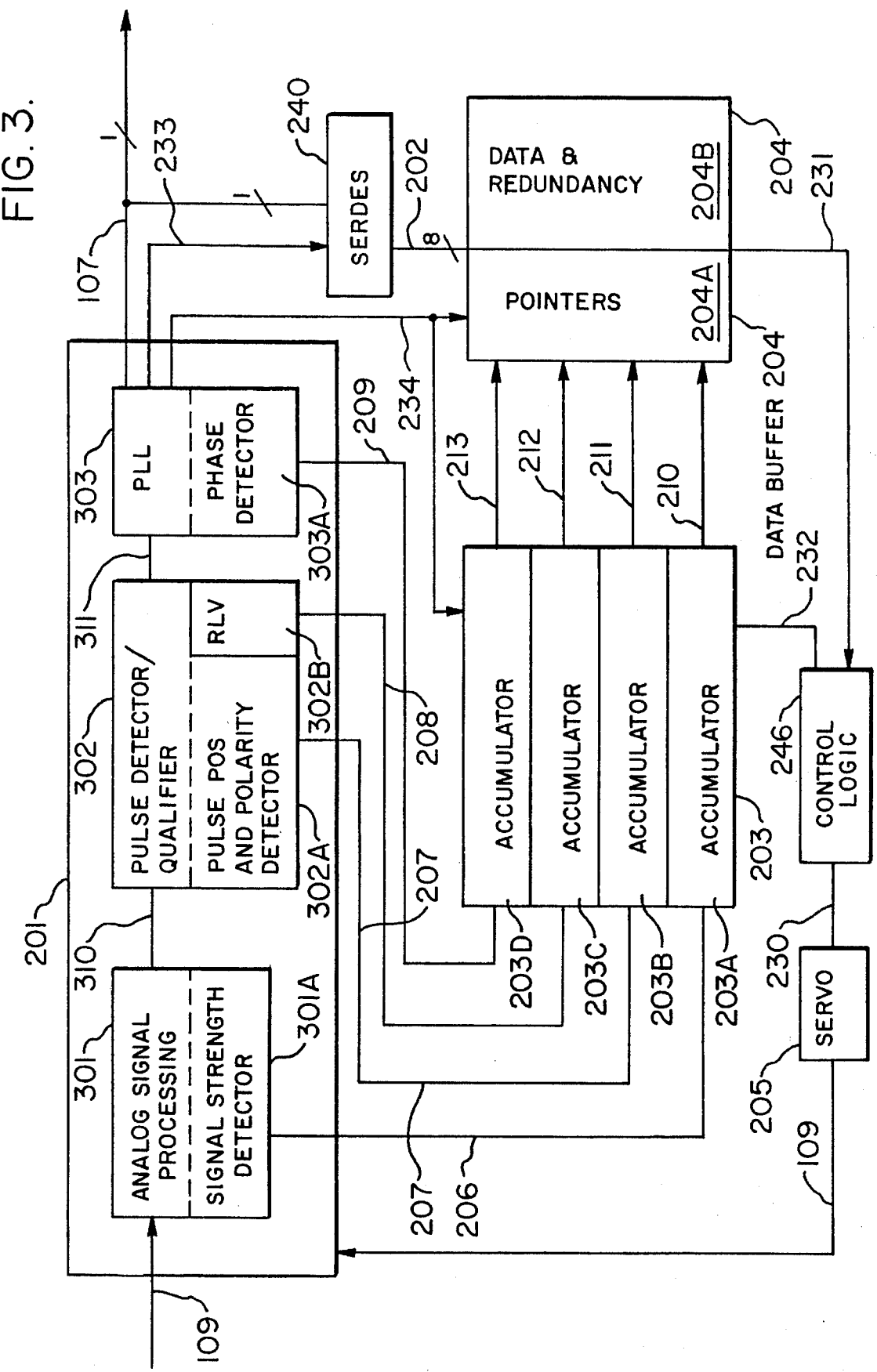
FIG. 3 illustrates further details of the signal processing and data recovery circuits of a drive module.

Description of FIGS. 2 and 3

The above-described disk drive DASD string 120 of FIG. 1 is also equipped with a plurality of track image data buffers 204 (FIG. 2) on a one per actuator 112 basis. Track image data buffer 204 temporarily stores the entire data track image read by its read/write head 110 and applied to the signal processing and data recovery circuits 201 of drive electronics 108.

FIG. 2 illustrates additional details of DASD string 120 including control module 106 and drive electronics 108 of drive module 115. Data is read in analog form from disk surface 111 by head 110 and applied over path 109 to the input of signal processing and data recovery circuits 201 (FIG. 2) within drive electronics 108. The signal processing and data recovery circuits 201, which are shown in greater detail on FIG. 3, convert the signal on path 109 from analog form to a digital signal that is typically self-clocked. This digital signal is applied by signal processing and data recovery circuits 201 to path 107. From there it is applied to the SERDES (serializer-deserializer) element 240 which converts each byte on path 107 from a 1-bit serial to 8-bit parallel format on path 202. Each 8-bit byte is applied over path 202 to track data buffer 204. The signal processing and data recovery circuits 201 include an address mark detector circuit (not shown) which, in a well-known manner, monitors the received data signals to identify the presence of an address mark that precedes the count field of each data record stored on disk 111. The received data signals are applied to path 107, converted from 1-bit serial to 8-bit parallel by SERDES 240, transmitted over bus 202 in 8-bit parallel form to track data buffer 204. The addressing of buffer 204 is done by control logic 246 and servo 205 which identifies the sector count of disk 111 and outputs this information on control lead 230 in a well-known fashion. The sector count is converted by control logic 246 to an address signal that is applied over path 231 to track data buffer 204. The signal on path 231 addresses buffer 204. A clock signal 234 from the phase lock loop 303 (FIG. 3) maintains clock timing synchronization to load data into buffer 204 over path 107 and 202. Thus, the data signal that is read from disk 111 is maintained in clock synchronization by phase lock loop 303 so that the data entered into buffer 204 accurately represents the data and redundancy bits read from disk 111.

Normally, when the system is functioning properly, the accuracy of the data portion of a record stored into buffer 204 is ensured because this data includes data bits and error correction code redundancy bits. The image of the entire track is thereby temporarily stored in buffer 204. However, although all bits of the track are stored in track data buffer 204, only the bits of the requested data record are applied over bus 107 to encoder/decoder 222 (FIG. 2) of control module 106.

Control module 106 can receive the requested data record either directly from the signal processing and data recovery circuits 201 when the record is read from disk 111 or subsequently from buffer 204. Control module 106 receives the information directly if it is idle when the record is read from the disk. If it is busy at that time, control module 106 receives the requested record at a later time from buffer 204 via SERDES 240 after the entire track has been read and entered into buffer 204. Buffer 204 appears transparent to control module 106 since the output of buffer 204 is identical to the signal output of the signal processing and data recovery circuits 201 except for its lack of synchronization with disk 111.

Most data storage errors caused by defects in disk 111 are corrected by control module 106 by means of its own error correction circuitry which includes EDAC 221. The presence of the redundancy bits in buffer 204 minimizes the possibility of any error occurring in the data transfer process since these redundancy bits are read out of buffer 204 and transmitted along with the data bits of a record over path 107 to EDAC 221 of control module 106.

Control module 106 receives a data record read request from host processor 100 after the request is translated by control unit 104 into a volume/cylinder/head identifier. Module 106 monitors the output of the designated read/write head 110 when it reads the requested data record. In so doing, control module 106 senses the gaps, address mark and count/key fields of each data record on the track containing the requested data record. Upon the positioning of the requested data record under the read/write head, control module 106 causes buffer 204 to store the track image of the requested data record as well as all remaining data records on the same track. Control module 106 signals control unit 104 after the requested data record is stored in buffer 204. Once a data path is available from control unit 104 to host processor 100 via one of data channels 103, control unit 104 retrieves the requested data record from control module 106 for transfer to host processor 100. If control module 106 is idle when the record is read, the control module receives the data signals representing the record from path 107 and extends them to the host processor via control unit 104.

Track buffer 204 concurrently stores the requested data record as well as the remainder of the data storage track. As a matter of design choice, the track image containing the requested record is stored beginning with the first data record that appears on the data storage track following the receipt of the data record retrieval request. The requested data record, after being read from the disk, can be retrieved from track image buffer 204 by control module 106 for transmission to host processor 100.

In a certain percentage of read operations, the requested data record need not be stored in buffer 204 since a channel 103 from control unit 104 to host processor 100 is available when the data record is read from disk 111. In this case, the requested data record is read by head 110 and signal processing circuit 201 and transmitted via bus 107 to control module 106. The entirety of the track containing the requested record is also read from disk 111 and stored in buffer 204 via SERDES 240 for possible later use by host processor 100. Buffer 204 therefore stores the entire data track regardless of whether a channel 103 from control unit 104 to host processor 100 is unavailable when the requested data record is read from disk 111.

In summary so far, when the system is operating satisfactorily, it operates in such a manner that in response to the receipt of a record read request from host processor 100, the entire track is read by head 110, applied to signal processing and data recovery circuits 201 with the output of these circuits being applied via SERDES 240 to track data buffer 204 which stores the entirety of the track. The requested data record may or may not be applied to control module 106 at this time. The requested data record is immediately transferred over path 107 to control module 106 if both bus 107 and control module 106 are idle when the record is read. This occurs concurrently with the entry of the entire track containing the requested record into buffer 204.

On the other hand, if control module 106 is busy when the requested data record is read, the requested record as well as the rest of the track containing the record are stored in track data buffer 204. Subsequently, when control module 106 becomes idle, the control module retrieves the requested record from buffer 204 by causing its microprocessor 220 to signal control logic 246 over path 235 requesting a readout of the requested record. Control logic 246 responds to this signal and transmits the necessary address and control signals over path 231 to buffer 204 to cause it to read out the requested data record and apply it over path 202, SERDES 240 and path 107 to control module 106.

Encoder/decoder 222 applies the received bits of a data record over path 223 to buffer 241 and EDAC 221 which uses the redundancy bits of the record to perform any necessary correction of the received data bits. The EDAC then applies only the data bits over path 105 to the control unit 104 for transmission over a channel 103 to host processor 100. If the host processor subsequently requests another data record on the same track, as is often the case, this other record is read out of track data buffer 204 and applied via SERDES 240 over path 107 via control module 106 and path 105 for transmission to the host processor. This is possible since the entirety of the data track now resides track data buffer 204.

In accordance with the present invention, the signal processing and data recovery circuits 201 contain additional circuitry which generates signals, termed error pointers, which augment the error correction capabilities provided by only the redundancy bits of each data record stored in disk 111. These pointer generation circuits comprise a plurality of detectors each of which monitors a unique characteristic of each data signal read from disk 111. These characteristics may be, for example, signal strength, signal phase, signal position and polarity, as well as RLL code violations. Each detector responds to the receipt of each received signal representing a data bit and determines whether the signal meets or does not meet the signal characteristic the detector is monitoring. In response to the receipt of each such signal the detector generates an output of 0 or 1 indicating whether or not the detector has "confidence" in the capability of the rest of the signal processing and data recovery circuits 201 to determine with precision whether the received signal represents a binary 1 or 0. In accordance with the present disclosure, each detector applies its output to an associated one of paths 206, 207, 208 and 209 to accumulator 203 on FIG. 2. It is assumed that a zero on any one of paths 206 through 209 indicates that the associated detector has confidence in the capability of circuits 201 to determine whether a received signal represents a binary 1 or 0. It is assumed that a detector applies a binary 1 to its associated one of paths 206 through 209 if the monitored characteristic of the received data signal is of such a low quality that circuits 201 may have difficulty in determining with confidence whether or not the received signal on path 109 represents a binary 1 or 0. Accumulator 203 stores these confidence indicator bits received on paths 206 through 209. When all eight bits of a data byte have been received, the accumulator outputs a byte confidence signal for each detector over paths 210 through 213 to track data buffer 204. Byte clock 234 synchronizes the confidence signals with data bytes at data buffer 204. Thus, when the entirety of a track is stored in buffer 204, the buffer contains the data and redundancy bits of each record on the track as well as four confidence bits for each byte of each record.

The pointer bits in track data buffer 204 are not normally read out of buffer 204 and applied via SERDES 240 over path 107 to control module 106. This is the case when EDAC 221 of module 106 determines that the pointer bits of a record are not necessary since the EDAC can use the redundancy bits of the record to correct any errors. However, in instances in which the system encounters a sufficiently large number of errors in reading a record such that the error correction capability of EDAC 221 is overwhelmed, the pointer bits of the record in track data buffer 204 are read out and applied via SERDES 240 and over path 107 and 224 to EDAC 221 which uses these pointer bits to identify the bytes that contain the most likely defective bits. The EDAC then uses the redundancy bits as well as the received pointer bits to correct the defective bits and transmits only the correct data bits of the record over path 105 to control unit 104 for transmission over a channel 103 to host processor 100.

As earlier mentioned, the pointer bits greatly enhance the error correction capability of the EDAC. Each symbol or byte that is in error basically has two unknowns. Namely, the identity of the byte that is in error as well as the error value. Each pointer in accordance with the present invention specifically identifies the byte that is in error and therefore eliminates one unknown, namely, the location or identity of the error byte. This permits an increased number of errors that can be corrected by the EDAC. In an extreme situation, the error correcting capabilities of the EDAC can be doubled over the number of errors that can be corrected in the same data if no pointers whatsoever existed.

Description of FIG. 3

FIG. 3 discloses further details of those portions of signal processing and data recovery circuits 201 that are relevant to the invention. Circuits 201 also contain other circuit elements which are well-known in the art and are not relevant to the present invention and are not shown in detail herein. Signal processing and data recovery circuits 201 receive analog signals representing data and redundancy bits read off disk 111 by head 110. These bits are received on path 109 in analog form by the analog signal processing portions of element 301 and applied in analog form over path 310 to the pulse detector qualifier portion of element 302. Element 302 converts the received analog signals to digital signals that it applies over path 311 to phase lock loop 303. Phase lock loop 303 extracts bit clock information from the RLL signal received on path 311. The digital RLL data signal is synchronized to the extracted bit clock and applied to path 107. The bit clock is applied to path 233. Phase lock look 303 also generates a modulo 8 byte clock from the bit clock which it applies to path 234.

Element 301 includes a detector 301A which monitors the signal strength of every signal representing a data bit on path 109. Signal strength detector 301A responds to each such received signal and applies a binary 0 to output path 206 if the received signal has an adequate signal strength. A binary 1 representing a low confidence level is applied to path 206 if the received signal on path 109 is of such a low value that the remainder of element 201 would have difficulty in determining whether the signal represents a binary 0 or a 1.

The pulse position and polarity detector 302A cooperates with pulse detector qualifier 302 and applies either a binary 0 or 1 to output conductor 207 when element 302 receives a data bit signal over path 310. Detector 302A applies a 0 to path 207 if the received signal sequence has the appropriate position and polarity of the 2,7 encoded string. Conversely, it applies a binary 1 as a low confidence indicator if the signal received on path 310 has a marginal pulse position or polarity. RLV (run length violation) detector 302B detects run length code violations and generates pointers that are applied to conductor 208.

In a similar manner, phase detector 303A cooperates with phase lock loop 303 as each data signal is received over path 311 and applies a 0 representing high confidence to path 209 if the phase of the received signal is not marginal. The phase detector applies a 1 as a low confidence indicator to path 210 if the phase of the received signal is measurably near the boundary separating bit cells.

SERDES 240 temporarily stores the serial data bits it receives over path 107 from PLL 303 and applies them in 8 bit parallel form over path 202 to track data buffer 204. Bit clock 233 from PLL 303 ensures synchronous operation of SERDES 240. Section 204B of buffer 204 receives and stores the 8 bit parallel data and redundancy bits from SERDES 240. The four sections 203A, 203B, 203C and 203D of accumulator 203 receive the confidence signals from paths 206 through 209. These confidence signals are received for each data bit received on path 109 and are accumulated over an interval of 8 bits corresponding to the eight bits of a data byte stored in section 204b of buffer 204. The byte clock signal received on path 234 from PLL 303 is used by each section of accumulator 203A to 203D to establish the accumulation interval. At the end of each accumulation interval, a confidence bit for the entire interval is applied over each of paths 210 through 213 as a byte pointer and stored in section 204A of buffer 204. The byte clock signal on path 234 is received by data buffer 204 to establish the byte storage interval for the data and redundancy bytes received on path 202 in synchronism with the pointer bits received on paths 210 through 213. In this manner, data buffer 204 stores the data and redundancy bytes of each record and, at the same time, stores four confidence pointer bits for each byte of the record.

Figure 5:
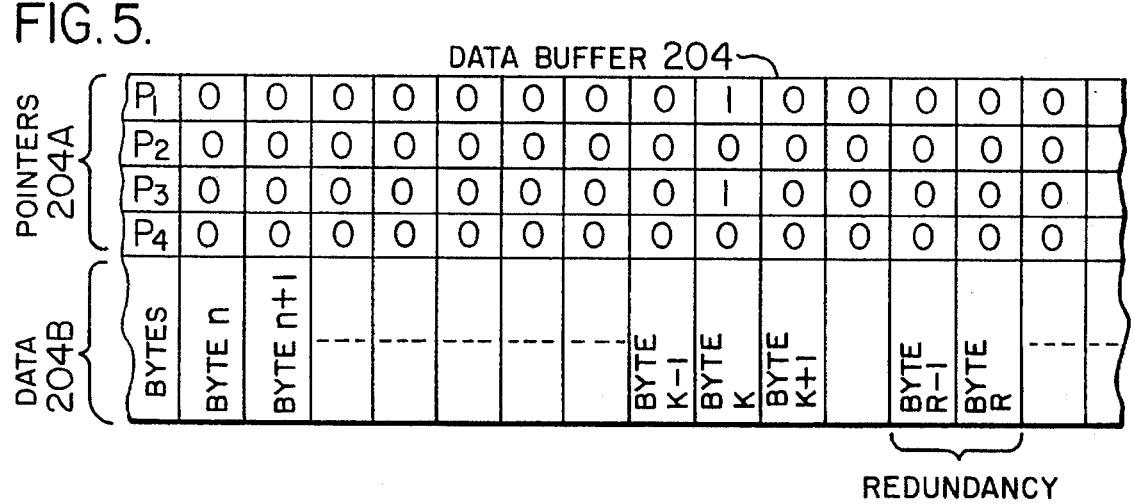
FIG. 5 illustrates how data bits, redundancy bits and pointer bits are recorded in the track data buffer in accordance with a first embodiment of the invention.

FIG. 5 shows how track data buffer 204 stores the information it receives. As shown on FIG. 5, buffer 204 includes a section 204B having different location stores each of which stores the data and redundancy bytes of received records. Buffer 204 also has four sections 204A which store the four pointer bits of each byte. The bytes in section 204B are designated on the left as byte n, byte n+1 and then, proceeding to the right, are designated byte k−1, byte k, byte k+1, byte R−1, byte R. Byte R−1 and byte R represent two bytes of the redundancy bytes appended to the data bytes of each record. Each byte in each section 204B of buffer 204 is associated with four pointer bits ($P_1$–$P_4$) in a corresponding section 204A.

The four pointer bits $P_1$ $P_2$ $P_3$ $P_4$ of byte n are 0000 indicating high confidence in the integrity of the signals representing byte n as received on path 109 from head 110. The pointer bits of byte K are 1010. The two pointer bits of 1 indicate a marginal or defective signal strength of the received signal for one or more of the bits of byte K as well as a possible run length code violation of the received signal for one or more of the bits of byte K. Pointer bits $P_1$ to $P_4$ are allowed to and used in correcting, both data bytes and redundancy bytes of the record.

Figure 6:
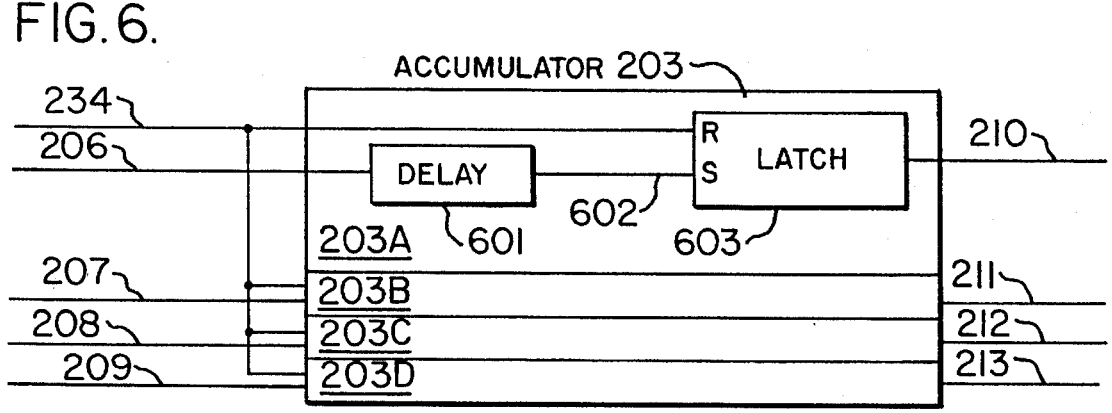
FIG. 6 illustrates further details of the accumulator of FIG. 2.

Description of FIG. 6

FIG. 6 discloses further details of accumulator 203 with only the details of section 203A being shown since the other three sections are identical. Section 203A comprises a delay element 601 having an output conductor 602 extending to latch element 603 set input. Latch 603 receives at its reset input a byte clock signal on path 234 from PLL 303. The output signal from latch 603 is applied to conductor 210 extending to data buffer 204. Accumulator element 203A receives the confidence signal from signal strength detector 301 and delays it in time by an amount equal to the time delay of the data signal through element 302 and element 303. The time delay is set in this way so that all signal paths between conductor 109 and data buffer 204 have equal delay, assuring uniqueness between the error pointers and data bytes stored in data buffer 204. Element 603 is a latch of type well known in the art as having set and edge triggered reset inputs. The pointer bit signal delayed by element 601 is received at the set input of latch 603. It is seen that a 1 received at the set input, indicating marginal or defective signal strength of the received signal 109, will produce a 1 output. The 1 output will persist until shortly after an active edge of byte clock on conductor 234 is applied to the reset input. The active edge of the byte clock signal on conductor 234 is also applied to data buffer 204. This stores the 1 output from latch 603 output along with the corresponding data or redundancy byte to indicate a low confidence level in the correctness of the stored byte. If a 1 is not received at the set input of latch 603 between the time of two active edges of the byte clock signal, a 0 will be stored in data buffer 204 along with the corresponding data or redundancy byte. This indicates a high confidence level. In this way, a single as well as multiple marginal bits are accumulated at latch 603 in byte intervals and applied to track data buffer 204 along with the corresponding data or redundancy byte.

Figure 4:
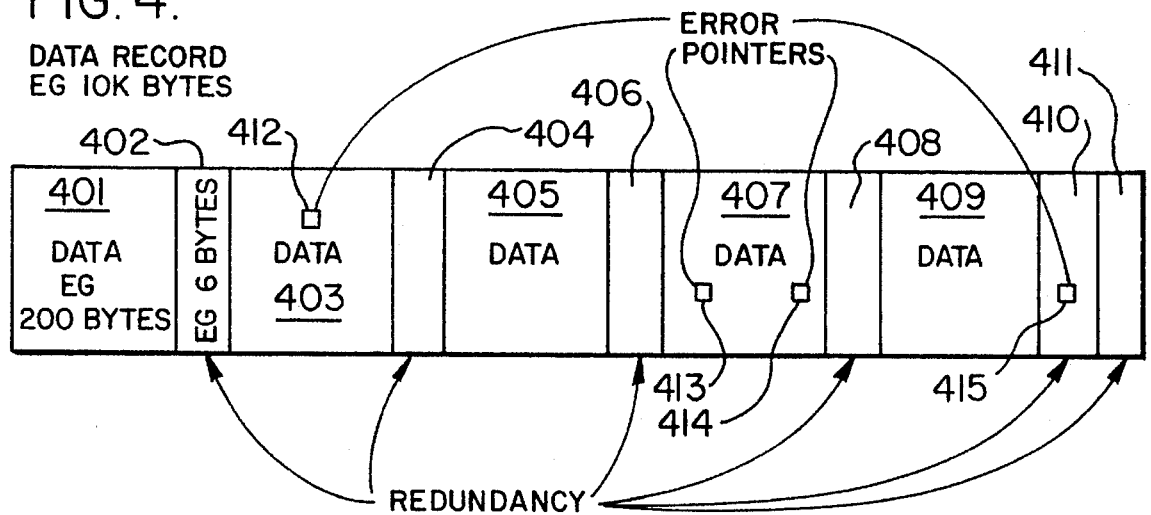
FIG. 4 illustrates error bits in a record having data bits, and redundancy bits.

Description of FIG. 4

FIG. 4 discloses the manner in which a record is stored in track data buffer 204. The data record shown on FIG. 4 for example may comprise 10,000 bytes which are divided into a plurality of data blocks and redundancy blocks with each data block, such as 401, being associated with an adjacent redundancy block, such as 402. The data blocks may typically have 200 bytes while the associated redundancy block may have 6 bytes. The redundancy bytes are used when necessary to correct the bytes of the associated data block.

In accordance with the present invention, each byte in the record of FIG. 4 has pointer bits indicating the confidence signal processing circuitry 201 has in the data and redundancy bytes. FIG. 4 shows the portion of the data record which is assumed to have pointers representing corrupted data. Specifically, data block 403 has a pointer bit 412 of 1 which indicates that the signal processing circuitry 201 has a low confidence in one of the data bytes of block 403. FIG. 4 also shows that block 407 has two error pointers 413 and 414 which indicate that the two data bytes of this block may possibly have defective data bits. Redundancy block 410 is show to have an error pointer 415.

FIG. 4 indicates that the data record contains the four error pointers 412 through 415. From the previously described inequality 2e+s≦d−1 it can be seen that the use of these four error pointers identifies four data bytes that are in error. This eliminates four of the unknowns from the left side of the inequality and permits the EDAC error correction facilities to be able to correct two additional data errors if necessary.

Figure 7:
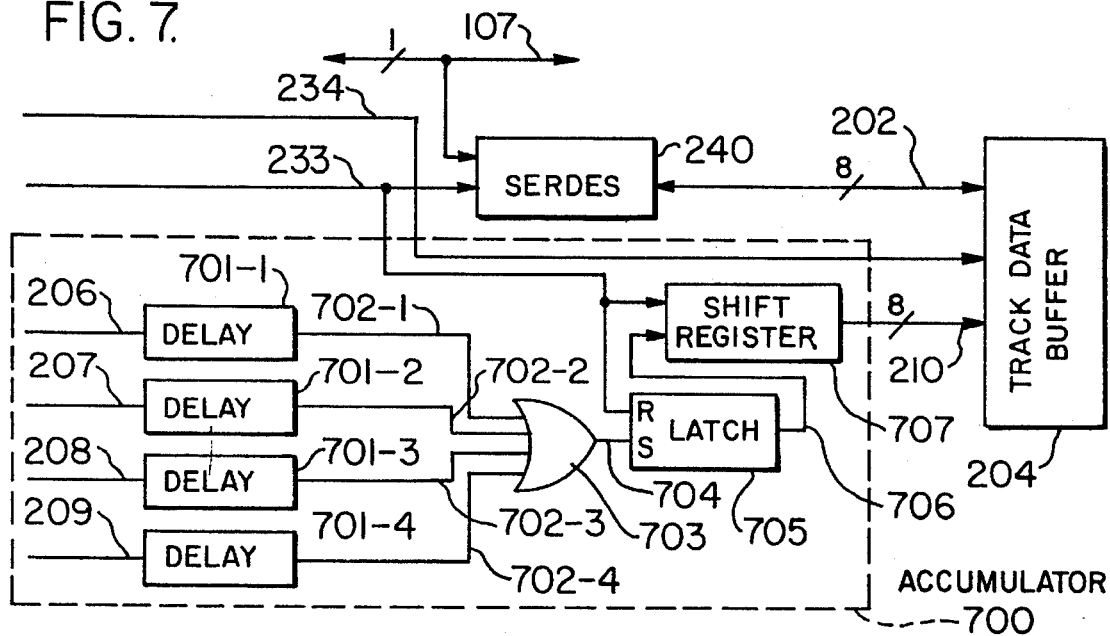
FIG. 7 illustrates an alternative embodiment of the invention which records pointer bits in the track image data buffer for each received data bit.

Description of FIG. 7

FIG. 7 shows the details of an alternative embodiment which advantageously may be used when highly corrupted data or data signal conditions may be encountered. In this arrangement, the system operation is such that under conditions in which good data and redundancy signals are received, the bytes of a requested record are read and stored in track data buffer 204 in the same manner as before described and made available over path 107 to control module 106. They can either be read out from track data buffer 204 and applied to module 106 or, alternatively, are applied directly from PLL 303 and over path 107 to module 106 if it is idle when the record is read as previously described. In the embodiment of FIG. 7, the pointer bits associated with the data record are not initially stored in track data buffer 204. Instead, when corrupted data is encountered, control module 106 determines that the received data is corrupted and requests the system to read the track a second time. On this second read operation, the data and redundancy bits and bytes of the requested record are not stored in buffer 204. Instead, they are read out of PLL 303 and immediately applied over path 107 to control module 106 which at this time has discarded the bytes it received on the first read of the record. On this second read of the same record, the confidence level pointers are generated in the same manner as previously described on a bit-by-bit basis and applied to conductors 206 through 209 and delayed by delay elements 701-1 to 701-4. The delay time of each of elements 701-1 to 701-4 are set in the same manner as previously described such that all signals originating from the signal on 109-0 which are to be stored in track buffer 204 have equal total path delay. The output from delay elements 701-1 to 701-4 are applied over conductors 702-1 to 702-4 and ORed by OR gate 703. The ORed output of gate 703 provides a single combined pointer bit for each received data bit and is applied over conductor 704 to the set input of latch 705 of type set, edge triggered reset. The edge triggered reset of latch 705 is a bit clock signal generated by PLL 303 and applied over path 233. Latch 705 accumulates any occurrence of a lack of confidence signal indicated by a 1 output by detectors 301A, 302A, 302B or 303A over the interval of one bit. The accumulated signal is applied over conductor 706 and is stored in shift register 707 at the same instant a new interval of accumulation is started. The synchronization of the storing in shift register 707 and accumulation interval in latch 705 is achieved by applying the same bit clock signal to each over path 233. Eight bits of combined pointers are stored in shift register 707 for a byte which is applied in parallel over path 210 and stored in track data buffer 204. A full complement of pointer bytes are stored in buffer 204 corresponding to the data and redundancy bytes of the record sent to control module 106 via path 107. They are subsequently read out of track data buffer 204 through SERDES 240 over path 202 and applied out serially over path 107 to control module 106 which at this time already has received from PLL 303 the data and redundancy bits for the record. EDAC 221 of control module 106 cooperates with encoder/decoder 222 and buffer 241 to attempt to generate good data from the highly corrupted redundancy and data bits of the record. The corrupted bits of the record are corrected using the combined capability of the redundancy bits and the generated pointer bits. Only the corrected data bits of the record are transmitted over path 105 to control unit 104 and in turn to host processor 100.

As earlier mentioned, the correction capabilities of the EDAC are characterized by the inequality 2e+s≦d−1 where e is the number of bytes in error not having pointers, where s is the number of bytes in error with pointers, and where d characterizes the distance of the code word and is generally equal to the number of redundancy symbols plus 1. As is seen from this equality, each error that is not associated with a pointer has two unknowns, namely the location of the byte containing the error and the data error itself. Similarly, each byte associated with an error pointer has only one unknown which is the data error itself. Therefore, the use of the error pointers greatly enhances the error correction capability of the EDAC by permitting an extra data error to be corrected for each received pointer. In an extreme situation where all bytes containing errors are identified by pointers, the use of the pointers permits the doubling of the number of error bytes that can be corrected with pointers compared to those than can be corrected without pointers.

In accordance with a third alternative embodiment of the invention, the width of track data buffer 204 is increased so that on each read of a track, the entirety of the track is stored in data buffer 204 bit by bit and at the same time the pointers are generated and a combined pointer is generated for each data bit and applied over path 210 of FIG. 7 to track data buffer 204. In accordance with this embodiment, each data and redundancy bit that is received for a record and stored in track data buffer 204 has an accompanying pointer bit of zero or one indicating whether the signal processing and data recovery circuits 201 have high or low confidence in the determined value of the data bit.

In accordance with this third embodiment, control module 106, if it is idle, may receive the data and redundancy bits of a requested record as it is first applied to path 107 by the signal processing and data recovery circuits. This situation would exist if control module 106 is idle when the requested data record was read. In the case, the requested data record as well as the entirety of the track containing this requested data record is concurrently read and entered into the track data buffer 204 along with the generated error pointers. Alternatively, in the event the control module 106 is busy when the requested data record is read, the entire track containing the record is stored along with generated error pointers in buffer 204. The control module may subsequently read out the track data buffer 204 to retrieve only the requested data record from data buffer 204. EDAC 221 of the control module performs any necessary correction of the data portion of the received record and passes it on over path 105 towards the host processor without the use of the pointers if the record is not excessively corrupted. If the data bit portion of the record is excessively corrupted insofar as data errors are concerned, then control module 106 causes the portion of track data buffer 204 that contains the error pointers for the requested data record to be read out and applied via SERDES 240 and over path 107 to control module 106. Upon the reception of these error pointers, the EDAC facilities of the control module use the pointers to correct the corrupted data and then transmits the corrected data over path 105 towards the host processor.

In summary, the foregoing has described three separate alternative embodiments of the invention. In accordance with the first embodiment FIGS. 1 through 6, a plurality of pointer bits from a corresponding plurality of detectors are recorded in track data buffer 204 for each data and redundancy byte of a requested record. The pointer bits and data/redundancy bytes are recorded concurrently on a first reading of the requested record. In accordance with the second embodiment of the invention portrayed in FIGS. 1 through 5 and 7, the pointer bits and data/redundancy bits are not recorded concurrently in data buffer 204. In this case, if the EDAC circuitry of the control module determines that the received data is excessively corrupted, the requested record is read a second time from disk 111 and on this second reading, only the pointer bits are recorded in track data buffer 204. The data/redundancy bits are not entered into the track data buffer but instead are sent directly over path 107 to control module 106 as the requested record is read for the second time. Control module 106 then reads out track data buffer 204 to retrieve the pointer bits and uses them as above-described to correct the errors in the corrupted data. In accordance with this second embodiment, a combined pointer bit for all detectors is recorded in the track data buffer for each received data/redundancy bit.

In accordance with a third embodiment of the invention, track data buffer 204 is of an increased width so that it can concurrently receive both the data/redundancy bits and pointer bits on the first read of the record. In this case, a combined pointer bit is recorded in the track data buffer for each data/redundancy bit. The control module 106 may either receive the data record immediately as it is read over path 107 or alternatively it may receive it via read out from track data buffer 204 via SERDES 240. If the data is determined to be excessively corrupted, the control module 106 may cause that portion of the data buffer that contains the pointer information to be read out and applied via SERDES 240 and path 107 to control module 106 for error correction purposes.

All above-described embodiments are advantageous in that they use the data/redundancy information and generated pointers from the same read of the requested record. This is a significant advantage and is preferable to situations in which the data received by the control module is that which is a read on a first read of the record while the pointers are generated on a second read of the record. The generation of the data/redundancy information and pointers from separate reads of a disk is undesirable since defects in the disk or intermittent problems in the electronics could result in different errors being detected on different reads of the same record. Therefore the use of the pointers generated on a second read of the record in connection with data retrieved on a first read of the record could cause problems in the error correction operation.

The embodiment of the invention above disclosed is further advantageous in that the interface comprising path 107 between drive electronics 108 and the control module 106 need not be altered in order to accommodate the present invention. Path 107 comprises an interface that is specifically designed to have a fixed transmission rate and a fixed bandwidth in order to maximize its efficiency. Path 107 is designed to accommodate a specific data transfer rate between drive electronics 108 and control module 106. This permits the bytes of a data record to be either transmitted directly over path 107 to the control module 106 as the record is read or alternatively to be transmitted from the track data buffer 204 via SERDES 240 and over path 107. In any event and in both instances, the data transmission rate over path 107 is fixed and does not vary. The pointer information is sent over path 107 from the track data buffer separate and apart from the transmission of the data/redundancy bytes of the same record. Thus, the characteristics of interface 107 may remain constant since the data/redundancy information is not sent over interface path 107 concurrently with the error pointer information. This permits the design of the interface path 107 to remain constant and eliminates the need to alter or redesign the characteristics of path 107 in order to accommodate the use of the present invention.

While a specific embodiment of the present invention has been disclosed, it is expected that those skilled in the art can and will devise alternate embodiments that fall within the scope of the appended claims.

I claim:

1. Apparatus for correcting errors in corrupted data recorded on one of a plurality of drive modules, said plurality of drive modules being serviced by a common control module, said apparatus comprising:

means for applying data signals recorded on said one drive module to an input of a signal processing means, said signal processing means being responsive upon the receipt of said data signals applied to said input for determining the binary value of each received data signal, at least one signal quality detector in said signal processing means connected to said input for determining whether each said received data signal is of a high quality that permits said signal processing means to determine with confidence the binary value represented by said each received data signal, said signal quality detector being responsive to each determination by said signal quality detector to generate pointer information indicating whether said signal processing means has high or low confidence in its ability to determine the binary value represented by the received data signal associated with said determination by said signal quality detector, means for applying binary data signals to said common control module connected to an output of said signal processing means with said binary data signals representing the binary values determined by said signal processing means for a plurality of received data signals, means connecting said signal processing means and said common control module for applying said pointer information to said common control module only when said binary data signals applied to said common control module represent corrupted received data signals for which said signal processing means has low confidence, and said common control module being responsive to the receipt of said pointer information for correcting errors in said corrupted data signals received by said common control module.

2. The apparatus of claim 1 wherein said means for applying said pointer information comprises means for applying at least one bit of pointer information to said common control module for each byte of a binary data signal applied to said common control module.

3. The apparatus of claim 1 wherein said means for applying said pointer information comprises means for applying at least one bit of pointer information to said common control module for each bit of a binary data signal applied to said common control module.

4. The apparatus of claim 1 wherein said apparatus further comprises:

a buffer memory, means connecting said signal processing means and said buffer memory for entering said generated pointer information into said buffer memory, and means connecting said common control module and said buffer memory for applying said pointer information from said buffer memory to said common control module only when said binary data signals applied to said common control module represent corrupted received data signals for which said signal processing means has low confidence.

5. Apparatus for correcting errors in corrupted data recorded on of a plurality of drive modules, said plurality of drive modules being serviced by a common control module, said apparatus comprising:

means for applying data signals recorded on said one drive module to an input of a signal processing means, said signal processing means being responsive upon the receipt of said data signals applied to said input for determining the binary value of each received data signal, a plurality of signal quality detectors in said signal processing means connected to said input with each signal quality detector being unique to a different characteristic of each said data signal received by said signal processing means for determining whether each said received data signal is of a high quality with respect to the characteristic unique to each said signal quality detector so as to permit said signal processing means to determine with confidence the binary value represented by said each received data signal, each of said signal quality detectors being responsive to each determination by said each signal quality detector to generate pointer information indicating whether said signal processing means has high or low confidence in its ability with respect to the signal characteristic unique to each said signal quality detector to determine the binary value represented by the received data signal associated with said each determination by said signal quality detector, means for applying binary data signals to said common control module connected to an output of said signal processing means with said binary data signals representing the binary values determined by said signal processing means for a plurality of received data signals, means connecting said signal processing means and said common control module for applying said pointer information generated by said signal quality detectors to said common control module only when said binary data signals applied to said common control module represent corrupted received data for which said signal processing means has low confidence, and said common control module being responsive to the receipt of said pointer information for correcting errors in said corrupted data signals received by said common control module.

6. The apparatus of claim 5 wherein said means for applying said pointer information comprises means for applying at least one bit of pointer information for each of said signal quality detectors to said common control module for each byte of said binary data signals applied to said common control module.

7. The apparatus of claim 5 wherein said means for applying said pointer information comprises means for applying at least one bit of pointer information for each of said signal quality detectors to said common control module for each bit of a binary data signal applied to said common control module.

8. The apparatus of claim 5 wherein said apparatus further comprises:

a buffer memory, means connecting said signal processing means and said buffer memory for entering said generated pointer information into said buffer memory, and means connecting said common control module and said buffer memory for applying said pointer information from said buffer memory to said common control module only when said binary data signals applied to said common control module represent corrupted received data signals for which said signal processing means has low confidence.

9. The apparatus of claim 5 wherein said received binary data signals applied to said common control module represent a data record having data bytes and redundancy bytes and wherein said common control module uses said redundancy bytes and said applied pointer information to correct errors in said data bytes.

10. Apparatus for correcting errors in corrupted data recorded on one of a plurality of drive modules, said plurality of drive modules being serviced by a common control module, said apparatus comprising:

means for applying data signals recorded on said one drive module arranged into bytes to an input of a signal processing means, said signal processing means being responsive upon the receipt of said data signals applied to said input for determining the binary value of each received data signal, a plurality of signal quality detectors in said signal processing means connected to said input with each signal quality detector being unique to a different characteristic of each received data signal for determining whether each said received signal is of a high quality with respect to the characteristic unique to each said signal quality detector so as to permit said signal processing means to determine with confidence the binary value represented by said each received data signal, each of said signal quality detectors being responsive to each determination by said each signal quality detector to generate pointer information indicating whether said signal processing means has high or low confidence in its ability, with respect to the signal characteristic unique to each said signal quality detector, to determine the binary value represented by the received data signal associated with said determination by said each signal quality detector, a buffer memory, means for applying binary data signals to said common control module with said binary data signals representing the binary values determined by said signal processing means for a plurality of received data signals, means connecting said signal processing means and said buffer memory for entering said pointer information into said buffer memory, and means connecting said buffer memory and said common control module for extending said pointer information from said buffer memory to said common control module only when said binary data signals applied to said common control module represent corrupted received data signals for which said signal processing means has low confidence.

11. The apparatus of claim 10 wherein said means for applying said pointer information comprises means for applying at least one bit of pointer information for each of said signal quality detectors to said common control module for each byte of said binary data signals applied to said common control module.

12. The apparatus of claim 10 wherein said means for applying said pointer information comprises means for applying at least one bit of pointer information for each of said signal quality detectors to said common control module for each bit of a binary data signal applied to said common control module.

13. The apparatus of claim 10 wherein said received data signals represent at least one data record having data bits and redundancy bits, said apparatus further comprising:

means in said common control module responsive when said binary data signals applied to said common control module contain a lesser number of errors of said data bits for correcting said errors using said redundancy bits, means in said common control module responsive when said binary data signals applied to said common control module contain a greater number of errors for reading said pointers from said buffer and applying said readout pointers to said common control module, means in said common control module responsive to the reception of said pointers of said record for using said pointers and said redundancy bits of said record to correct errors in said binary data signals of said record, and means for applying said corrected binary data signals to an output path of said common control module extending towards a data utilization circuit.

14. The apparatus of claim 10 wherein said common control module has an idle state and a busy state and wherein said means for applying said binary data signals to said common control module comprises:

means responsive if said common control module is idle when said bytes are read for applying said binary data signals from said signals processing means to said common control module, means responsive if said common control module is busy when said bytes are read for applying said binary data signals representing said bytes from said signals processing means to said buffer means for storage therein, and means responsive upon a subsequent idle state of said common control module for transferring said bytes from said buffer memory to said common control module.

15. The apparatus of claim 14 wherein said means for transferring said binary data signals from said signals processing means to said common control module comprises means for transferring said binary data signals serially bit by bit over a interface path to said common control module, and wherein said means for transferring said binary data signals from said signals processing means to said buffer memory comprises:

means for applying said binary data signals serially bit by bit to a serializer/deserializer for the conversing of said binary data signals to a byte parallel format, and means for applying said parallel bytes comprising said binary data signals to said buffer memory for storage therein, and wherein said means for transferring said binary data signals from said buffer memory to said common control module comprises:

means for reading out said buffer memory to apply said parallel bytes representing said binary data signals of said record to said serializer/deserializer for conversion from a parallel to a serial format, and means for applying said binary data signals serially form said serializer/deserializer over said interface path to said common control module.

16. The apparatus of claim 15 wherein said pointers are transferred as parallel bytes from said buffer memory to said serializer/deserializer for conversion from a parallel to a serial format, and means for applying said pointers serially form said serializer/deserializer over said interface path to said common control module.

17. Apparatus for correcting errors in corrupted bytes of binary data recorded on a track of one of a plurality of storage media, said plurality of storage media being serviced by a common control module, said apparatus comprising:

means for reading said data from said one medium, a signal processing means having an input for receiving data signals representing said data read from said one medium, means connecting said means for reading and said signal processing mean for applying said data signals read from said one medium to said input of said signal processing means, a plurality of signal quality detectors in said signal processing means connected to said input each of which is unique to a different characteristic of said received data signals, each of said signal quality detectors being responsive to the receipt of each data signal for determining whether the quality of said each received signal, with respect to the characteristic associated with each said signal quality detector, is sufficient to permit said signal processing means to determine the binary value represented by each said received data signal, each of said signal quality detectors being responsive to each determination by said each signal quality detector to generate a pointer bit having a binary value indicating whether said signal processing means has high or low confidence in its ability to determine the binary value represented by the received data signal associated with each said determination, a buffer memory, means for applying binary data signals representing the determined binary value of each received data signal to said common control module, means for entering pointer information representing said pointers bits into said buffer memory, and means for applying said pointers information from said buffer memory to said common control module only when said binary data signals applied to said common control module represent corrupted received data signals for which said signal processing means has low confidence.

18. The apparatus of claim 17 wherein said means for applying said pointer information comprises means for applying a pointer bit for each of said signal quality detectors for each byte of said binary data signals.

19. The apparatus of claim 17 wherein said means for applying said pointer information comprises means for applying a pointer bit for each of said signal quality detectors for each bit of said binary data signals.

20. The apparatus of claim 17 wherein said means for applying said binary data signals to said common control module comprises means for applying said binary data signals over a path connecting said signal processing means and said common control module concurrently with the reading of said data by said reading means.

21. The apparatus of claim 17 wherein said means for applying said binary data signals to said common control module comprises:

means for applying said binary data signals from said signal processing means to said buffer memory as said data is read by said reading means, and means for subsequently reading out said memory to apply said binary data signals to said common control module.

22. The apparatus of claim 17 wherein said received data signals represent at least one data record recorded on said one medium with said record having data bits and redundancy bits, said apparatus further comprising:

means in said common control module responsive when said binary data signals applied to said common control module contain a lesser number of errors in said data bits for correcting said errors using said redundancy bits, means in said common control module responsive when said data signals applied to said common control module contain a greater number of errors in said data bits for reading said pointer bits associated with said record from said buffer and applying said readout pointer bits to said common control module, means in said common control module responsive to the reception of said pointer bits for said record for using said pointers and said redundancy bits of said record to correct errors in said data bits of said record, and means for applying said corrected data bits to an output path of said common control module extending towards a data utilization circuit.

23. The apparatus of claim 17 wherein said received data signals represent at least one data record recorded on said one medium with said record having data bits and redundancy bits, said apparatus further comprising:

means in said common control module responsive when said binary data signals applied to said common control module contain a lesser number of errors in said data bits for correcting said errors using said redundancy bits, means in said common control module responsive when said data signals applied to said common control module contain a greater number of errors in said data bits for reading said record on said one medium a second time, means responsive to said second reading of said record for applying said binary data bits from said signal processing means to said common control module, means further responsive to said second reading of said record for applying information representing said generated pointer bits to said buffer memory for storage therein, means for subsequently applying said pointer information from said memory to said common control module, means in said common control module responsive to the reception of said pointer information for said record for using said pointer information and said redundancy bits of said record to correct errors in said data bits of said record, and means for applying said corrected data bits to an output path of said common control module extending towards a data utilization circuit.

24. A method of correcting errors in corrupted data signals stored on one of a plurality of storage media, said plurality of storage media being serviced by a common control module, said method comprising the steps of:

applying data signals to an input of a signal processing means, said signal processing means being responsive for determining the binary value of each received data signal, operating at least one signal quality detector in said signal processing means connected to said input in response to the receipt of each data signal for determining whether each said received data signal is of a high quality that permits said signal processing means to determine with confidence the binary value represented by said each received data signal, said signal quality detector being responsive to each determination by said signal quality detector to generate pointer information indicating whether said signal processing means has high or low confidence in its ability to determine the binary value represented by the received data signal associated with said determination by said signal quality detector, applying binary data signals representing the binary values determined by said signal processing means for a plurality of received data signals to said common control module connected to an output of said signal processing means, applying said pointer information to said common control module only when said binary data signals applied to said common control module represent corrupted received data signals for which said signal processing means has low confidence, and said common control module being responsive to the receipt of said pointer information for correcting errors in said corrupted data signals received by said common control module.

25. The method of claim 24 wherein said step of applying said pointer information comprises the step of applying at least one bit of pointer information to said common control module for each byte of a binary data signal applied to said common control module.

26. The method of claim 24 wherein said step of applying said pointer information comprises the step of applying at least one bit of pointer information to said common control module for each bit of a binary data signal applied to said common control module.

27. The method of claim 24 wherein said method further comprises the steps of:

entering said generated pointer information into a buffer memory, and applying said pointer information from said buffer memory to said common control module only when said binary data signals applied to said common control module represent corrupted received data signals for which said signal processing means has low confidence.

28. A method of correcting errors in corrupted data signals stored on one of a plurality of storage media, said plurality of storage media being serviced by a common control module, said method comprising the steps of:

applying data signals to an input of a signal processing means, said signal processing means being responsive for determining the binary value of each received data signal, operating a plurality of signal quality detectors in said signal processing means with each signal quality detector being unique to a different characteristic of each received data signal and further being responsive to the receipt of each data signal by said signal processing means for determining whether each said received data signal is of a high quality with respect to the characteristic unique to each said signal quality detector so as to permit said signal processing means to determine with confidence the binary value represented by said each received data signal, each of said signal quality detectors being responsive to each determination by said each signal quality detector to generate pointer information indicating whether said signal processing means has high or low confidence in its ability with respect to the signal characteristic unique to each said signal quality detector to determine the binary value represented by the received data signal associated with said determination by said signal quality detector, applying binary data signals representing the binary values determined by said signal processing means for a plurality of received data signals to said common control module connected to an output of said signal processing means, applying said pointer information generated by said signal quality detectors to said common control module only when said binary data signals applied to said common control module represent corrupted received data for which said signal processing means has low confidence, and said common control module being responsive to the receipt of said pointer information for correcting errors in said corrupted data signals received by said common control module.

29. The method of claim 28 wherein said step of applying said pointer information comprises the step of applying at least one bit of pointer information for each of said signal quality detectors to said common control module for each byte of said binary data signals applied to said common control module.

30. The method of claim 28 wherein the step of applying said pointer information comprises the step of applying at least one bit of pointer information for each of said signal quality detectors to said common control module for each bit of a binary data signal applied to said common control module.

31. The method of claim 28 wherein said method further comprises the steps of:

entering said generated pointer information into said buffer memory, and applying said pointer information from said buffer memory to said common control module only when said binary data signals applied to said common control module represent corrupted received data signals for which said signal processing means has low confidence.

32. The method of claim 28 wherein said received binary data signals applied to said common control module represent a data record having data bytes and redundancy bytes and wherein said common control module uses said redundancy bytes and said applied pointer information to correct errors in said data bytes.

33. A method of correcting errors in corrupted data signals stored on one of a plurality of storage media, said plurality of said storage media being serviced by a common control module, said method comprising the steps of:

applying bytes of data signals to an input of a signal processing means, said signal processing means being responsive for determining the binary value of each received data signal, operating a plurality of signal quality detectors in said signal processing means with each signal quality detector being unique to a different characteristic of each received data signal and further being responsive to the receipt of each data signal for determining whether each said received signal is of a high quality with respect to the characteristic unique to each said signal quality detector so as to permit said signal processing means to determine with confidence the binary value represented by said each received data signal, each of said signal quality detectors being responsive to each determination by said each signal quality detector to generate pointer information indicating whether said signal processing means has high or low confidence in its ability, with respect to the signal characteristic unique to each said signal quality detector, to determine the binary value represented by the received data signal associated with said determination by said each signal quality detector, applying binary data signals representing the binary values determined by said signal processing means for a plurality of received data signals to said common control module, entering said pointer information into a buffer memory, and extending said pointer information from said buffer memory to said common control module only when said binary data signals applied to said common control module represent corrupted received data signals for which said signal processing means has low confidence.

34. The method of claim 33 wherein said step of applying said pointer information comprises the step of applying at least one bit of pointer information to said common control module for each byte of said binary data signals applied to said common control module.

35. The method of claim 33 wherein said step of applying said pointer information comprises the step of applying at least one bit of pointer information to said common control module for each bit of a binary data signal applied to said common control module.

36. The method of claim 33 wherein said received data signals represent at least one data record having data bits and redundancy bits, said method further comprising the steps of:

operating means in said common control module responsive when said binary data signals applied to said common control module contain a lesser number of errors of said data bits for correcting said errors using said redundancy bits, reading said pointers from said buffer and applying said readout pointers to said common control module only when said binary data signals applied to said common control module contain a greater number of errors, using said pointers and said redundancy bits of said record to correct errors in said binary data signals of said record in response to the reception of said pointers of said record, and applying said corrected binary data signals to an output path of said common control module extending towards a data utilization circuit.

37. The method of claim 33 wherein said common control module has an idle state and a busy state and wherein said step for applying said binary data signals to said common control module comprises:

applying said binary data signals from said signals processing means to said common control module if said common control is idle when said record is read, applying said binary data signals representing said record from said signals processing means to said buffer means for storage therein if said common control module is busy when said record is read, and transferring said record from said buffer memory to said common control module upon a subsequent idle state of said common control module.

38. The method of claim 37 wherein said step for transferring said binary data signals from said signals processing means to said common control module comprises the step of transferring said binary data signals serially bit by bit over a interface path to said common control module, and wherein said step of transferring said binary data signals from said signals processing means to said buffer memory comprises the steps of:
applying said binary data signals serially bit by bit to a serializer/deserializer for the conversing of said binary data signals to a byte parallel format, and
applying said parallel bytes comprising said binary data signals to said buffer memory for storage therein, and
wherein said step of transferring said binary data signals from said buffer memory to said common control module comprises the steps of:
reading out said buffer memory to apply said parallel bytes representing said binary data signals of said record to said serializer/deserializer for conversion from a parallel to a serial format, and
applying said binary data signals serially form said serializer/deserializer over said interface path to said common control module.

39. The method of claim 38 wherein said pointers are transferred as parallel bytes from said buffer memory to said serializer/deserializer for conversion from a parallel to a serial format, and wherein said method further comprises applying said pointers serially from said serializer/deserializer over said interface path to said common control module.

40. A method of correcting errors in corrupted bytes of binary data recorded on a track of one of a plurality of storage media, said plurality of storage media being serviced by a common control module, said method comprising the steps of:

reading said data from said one medium, applying data signals representing said data read from said one medium to an input of a signal processing means, operating a plurality of signal quality detectors in said signal processing means each of which is unique to a different characteristic of said received data signals, each of said signal quality detectors being responsive to the receipt of each data signal for determining whether the quality of said each received signal, with respect to the characteristic associated with each said signal quality detector, is sufficient to permit said signal processing means to determine the binary value represented by each said received data signal, each said signal quality detector being responsive to each determination by said each signal quality detector to generate a pointer bit having a binary value indicating whether said signal processing means has high or low confidence in its ability to determine the binary value represented by the received data signal associated with each said determination, applying binary data signals representing the determined binary value of each received data signal to said common control module, entering pointer information representing said pointers bits into a buffer memory, and applying said pointers information from said buffer memory to said common control module only when said binary data signals applied to said common control module represent corrupted received data signals for which said signal processing means has low confidence.

41. The method of claim 40 wherein said step of applying said pointer information comprises the step of applying a pointer bit for each of said signal quality detectors for each byte of said binary data signals.

42. The method of claim 40 wherein said step of applying said pointer information comprises the step of applying a pointer bit for each of said signal quality detectors for each bit of said binary data signals.

43. The method of claim 40 wherein said step of applying said binary data signals to said common control module comprises the step of applying said binary data signals over a path connecting said signal processing means and said common control module concurrently with the reading of said record by said reading means.

44. The method of claim 40 wherein said step of applying said binary data signals to said common control module comprises the steps of:

applying said binary data signals from said signal processing means to said buffer memory as said record is read by said reading means, and subsequently reading out said memory to apply said binary data signals to said common control module.

45. The method of claim 40 wherein said received data signals represent at least one data record recorded on said one medium with said record having data bits and redundancy bits, said method further comprising the steps of:

operating means in said common control module responsive when said binary data signals applied to said common control module contain a lesser number of errors in said data bits for correcting said errors using said redundancy bits, reading said pointer bits associated with said record from said buffer and applying said readout pointer bits to said common control module only when said data signals applied to said common control module contain a greater number of errors in said data bits, using said pointers and said redundancy bits of said record to correct errors in said data bits of said record in response to the reception of said pointer bits for said record, and applying said corrected data bits to an output path of said common control module extending towards a data utilization circuit.

46. The method of claim 40 wherein said received data signals represent at least one data record recorded on said one medium with said record having data bits and redundancy bits, said method further comprising the steps of:

operating means in said common control module responsive when said binary data signals applied to said common control module contain a lesser number of errors in said data bits for correcting said errors using said redundancy bits, reading said record on said one medium a second time when said data signals applied to said common control module contain a greater number of errors in said data bits, applying said binary data bits from said signal processing means to said common control module in response to said second reading of said record, applying pointer information representing generated pointer bits to said buffer memory for storage therein in response to said second reading of said record, subsequently applying said pointer information from said memory to said common control module, using said pointer information and said redundancy bits of said record to correct errors in said data bits of said record in response to the reception of said pointer information for said record, and applying said corrected data bits to an output path of said common control module extending towards a data utilization circuit.

* * * * *